United States Patent
Fukami

(10) Patent No.: US 8,814,440 B2
(45) Date of Patent: Aug. 26, 2014

(54) THRUST ROLLER BEARING

(75) Inventor: Rino Fukami, Iwata (JP)

(73) Assignee: NTN Corporation, Osaka (JP)

( * ) Notice: Subject to any disclaimer, the term of this patent is extended or adjusted under 35 U.S.C. 154(b) by 619 days.

(21) Appl. No.: 12/739,038

(22) PCT Filed: Sep. 10, 2008

(86) PCT No.: PCT/JP2008/066301
§ 371 (c)(1),
(2), (4) Date: Apr. 21, 2010

(87) PCT Pub. No.: WO2009/054200
PCT Pub. Date: Apr. 30, 2009

(65) Prior Publication Data
US 2010/0247020 A1    Sep. 30, 2010

(30) Foreign Application Priority Data
Oct. 22, 2007   (JP) .................................. 2007-273625

(51) Int. Cl.
*F16C 33/46*  (2006.01)
(52) U.S. Cl.
USPC ........................................................ 384/623
(58) Field of Classification Search
USPC .................. 384/572, 575, 580, 614, 621, 623
See application file for complete search history.

(56) References Cited

U.S. PATENT DOCUMENTS

| | | | |
|---|---|---|---|
| 3,881,790 A * | 5/1975 | Ryanen | 384/576 |
| 5,584,583 A | 12/1996 | Hidano | |
| 7,594,761 B2 * | 9/2009 | Koyama et al. | 384/572 |

FOREIGN PATENT DOCUMENTS

| | | |
|---|---|---|
| CN | 200993167 | 12/2007 |
| JP | 1-168016 | * 11/1989 |
| JP | 7-103240 | 4/1995 |
| JP | 2000-145790 | 5/2000 |
| JP | 2003-336645 | 11/2003 |
| JP | 2006-17201 | 1/2006 |
| JP | 2006-118562 | 5/2006 |
| JP | 2006-153200 | 6/2006 |
| JP | 2006-170371 | 6/2006 |
| JP | 2007-247819 | 9/2007 |
| WO | WO2008/105203 | * 9/2008 |

* cited by examiner

*Primary Examiner* — James Pilkington
(74) *Attorney, Agent, or Firm* — Clark & Brody

(57) ABSTRACT

A thrust roller bearing (21) comprises a plurality of rollers (23) and an annular retainer (11) having a plurality of pockets (14) for containing the rollers (23), not bent in a thickness direction and guided by the rollers. Each of first and second roller retaining parts (17a) and (17b) for retaining the roller (23) includes an arc-shaped curved line projecting toward the pocket in a cross section provided by cutting the retainer (11) by a plane containing the first and second roller retaining parts (17a) and (17b) and perpendicular to a center axis (30) of the roller (23).

6 Claims, 6 Drawing Sheets

THRUST ROLLER BEARING

TECHNICAL FIELD

The present invention relates to a thrust roller bearing and more particularly, to a thrust roller bearing comprising an annular retainer.

BACKGROUND ART

A thrust roller bearing supporting a thrust load is used in a part to which the thrust load is applied in an automatic transmission of a car. Recently, the thrust roller bearing is required to lower torque in view of lower fuel consumption as well as to be prevented from being damaged.

The thrust roller bearing has track rings such as an outer ring and an inner ring, a plurality of rollers, and a retainer retaining the rollers in general. FIG. 11 is a sectional view showing a part of a conventional thrust roller bearing. Referring to FIG. 11, a thrust roller bearing 101 comprises a plurality of needle rollers 103 arranged between a pair of track rings 102a and 102b and rolling on track surfaces of the track rings 102a and 102b, and a retainer 104 retaining the plurality of needle rollers 103. The retainer 104 is bent several times in a rotation axis direction of the retainer 104 such that its cross section has a roughly W shape. A flange part 105a extending in an axial direction is provided at an outer diameter side end of the track ring 102a. In addition, a flange part 105b extending in the axial direction is provided at an inner diameter side end of the track ring 102b.

A technique regarding a thrust roller bearing having the same constitution as the above is disclosed in Japanese Unexamined Patent Publication No. 2006-170371. According to the Japanese Unexamined Patent Publication No. 2006-170371, a thrust roller bearing has a pair of track rings, needle rollers arranged between the track rings, and a retainer retaining the needle rollers. The retainer is bent in an axial direction so as to have a W-shaped cross section. Thus, a height in the axial direction of an outer diameter part and an intermediate part is smaller than a height in the axial direction of an inner diameter to lower torque.

In addition, according to Japanese Unexamined Patent Publication No. 2006-118562, a retainer provided in a thrust roller bearing is constituted such that one wholly annular element having a U-shaped cross section and the other wholly annular element having an inverted U-shaped cross section are combined. According to the Japanese Unexamined Patent Publication No. 2006-118562, a contact area between a track ring and the retainer in a radial direction is reduced to lower friction and to lower torque.

Referring to FIG. 11 again, during the operation of the thrust roller bearing 101, while the track rings 102a and 102b rotate together with the retainer 104, a rotation axis of the track rings 102a and 102b does not coincide with a rotation axis of the retainer 104 due to dimensional deviation and the like in some cases. In this case, the retainer 104 is sandwiched between the track rings 102a and 102b in the radial direction, more specifically, between the flange parts 105a and 105b of the track rings 102a and 102b, so that a load is applied in the radial direction from the track rings 102a and 102b to the retainer 104. Therefore, strength against the radial load is required to be high in the retainer 104.

Here, according to the Japanese Unexamined Patent Publication No. 2006-170371, the retainer is provided by bending a thin plate member several times so as to have the W-shaped cross section. Since the radial strength is low in such retainer, the retainer could be damaged and deformed in the above case.

In addition, according to the Japanese Unexamined Patent Publication No. 2006-118562, since the retainer is composed of the plurality of members, they could be separated during the operation of the thrust roller bearing.

Furthermore, according to the Japanese Unexamined Patent Publication No. 2006-170371 and the Japanese Unexamined Patent Publication No. 2006-118562, the retainer provided in the thrust roller bearing comes in contact with the track ring in a thickness direction in the operation state of the thrust roller bearing. In this case, torque could be increased due to the contact between the retainer and the track ring in the operation state of the thrust roller bearing.

DISCLOSURE OF THE INVENTION

It is an object of the present invention to provide a low torque thrust roller bearing that can be prevented from being damaged.

A thrust roller bearing according to the present invention includes a plurality of rollers and an annular retainer having a plurality of pockets for containing the rollers, not bent in a thickness direction and guided by the rollers. A roller retaining part for retaining the roller includes a curved line projecting toward the pocket in a cross section provided by cutting the retainer by a plane containing the roller retaining part and perpendicular to a center axis of the roller.

According to the above retainer of the thrust roller bearing, since it is not bent in the thickness direction, the radial strength is high. Thus, even when the retainer is provided in the thrust roller bearing and receives a load from the track ring in the radial direction during the operation, the retainer can be prevented from being damaged and deformed. Furthermore, since the retainer is guided by the roller, the track ring and the retainer are not in contact with each other in the thickness direction during the operation of the thrust roller bearing. In addition, since the roller retaining part contains the curved line projecting toward the pocket in the above cross section, a contact area between the roller and the roller retaining part can be small. Thus, friction when the retainer and the roller are in contact with each other can be considerably reduced. Therefore, the torque can be reduced in the thrust roller bearing.

Preferably, the roller retaining part has an arc shape in the cross section. In addition, it is preferable that a curvature radius of the roller retaining part is smaller than a curvature radius of the roller. Thus, the roller retaining part has a smooth surface and the contact area can be small and the torque can be reduced.

Further preferably, the roller retaining part is provided on each circumferential side wall surface of the pocket. Thus, the roller and the retainer are in contact with each other in circumferential each side wall surface of the pocket, the roller and the retainer can be in contact with each other more stably.

Further preferably, the roller retaining part includes a first roller retaining part provided in one side wall surface of the pocket and abutting on the roller from the upper side of the roller, and a second roller retaining part provided in the other side wall surface of the pocket and abutting on the roller from the lower side of the roller. Thus, the retainer is in contact with the upper side of the roller at the first roller retaining part provided in the one side wall surface, and in contact with the lower side of the roller at the second roller retaining part provided in the other side wall surface. Thus, the position of the retainer in the thickness direction can be stable.

Further preferably, the first and second roller retaining parts are provided at different axial positions of the roller. Thus, when the roller is housed in the pocket, it can be easily housed. In addition, the structures of the first and second roller retaining parts can be easily produced.

Further preferably, at least one radial end face of the retainer includes a projection part projecting in a radial direction. Thus, when the retainer is in contact with the track ring in the radial direction during the operation of the thrust roller bearing, their contact area can be small. Therefore, the torque can be reduced in the thrust roller bearing.

Further preferably, in a cross section cut by a plane parallel to a rotation axis of the retainer and containing the rotation axis thereof, a point projecting the most in the radial direction in the projection part is arranged at a position shifted from a center line of the retainer in a thickness direction. In addition, it may be such that the projection part composed of a first and second surfaces positioned on both sides of the retainer in a thickness direction and extending so as to be continued from two width surfaces extending in the radial direction, and a radial length of the first surface is longer than a radial length of the second surface in the above cross section.

Thus, when the retainer is incorporated between the track rings, it can be easily incorporated and after the retainer is incorporated, it is not likely to be separated from the track rings.

According to the above constitution, since the above retainer of the thrust roller bearing is not bent in the thickness direction, the radial strength is high. Thus, even when the retainer is provided in the thrust roller bearing and receives a load from the track ring in the radial direction during the operation, the retainer can be prevented from being damaged and deformed. Furthermore, since the retainer is guided by the roller, the track ring and the retainer are not in contact with each other in the thickness direction during the operation of the thrust roller bearing. In addition, since the roller retaining part contains the curved line projecting toward the pocket in the above cross section, a contact area between the roller and their roller retaining part can be small. Thus, friction when the retainer and the roller are in contact with each other can be considerably reduced. Therefore, the torque can be reduced in the thrust roller bearing.

BEST MODE FOR CARRYING OUT THE INVENTION

Figure 2:
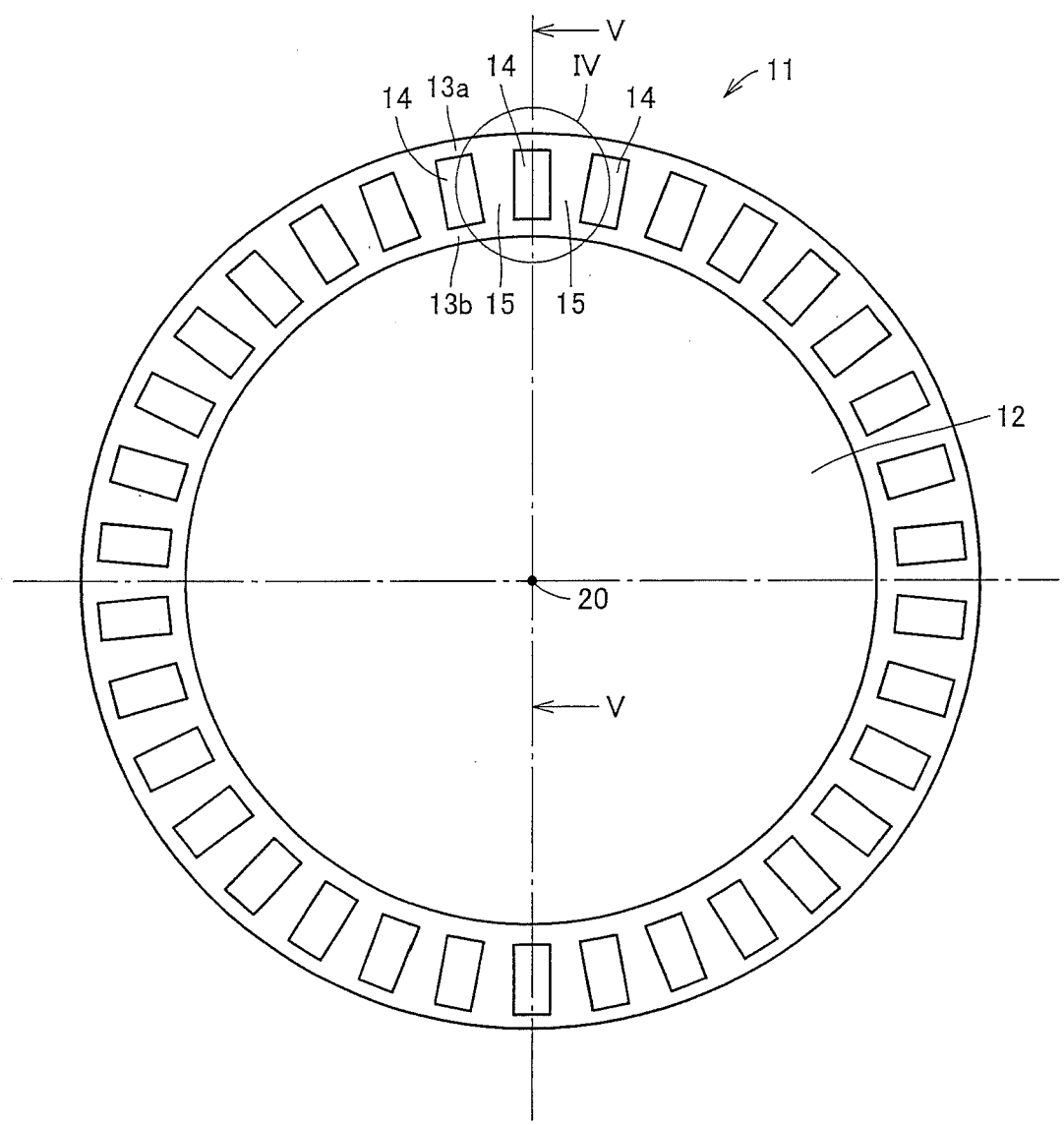
FIG. 2 is a view showing a retainer provided in the thrust roller bearing according to one embodiment of the present invention, viewed from a thickness direction.
Figure 3:
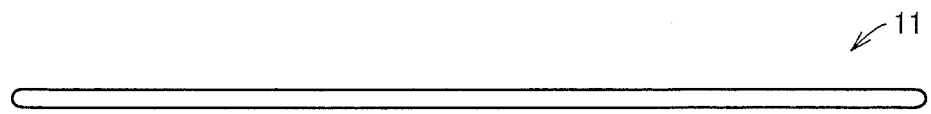
FIG. 3 is a side view showing the retainer shown in FIG. 2.
Figure 4:
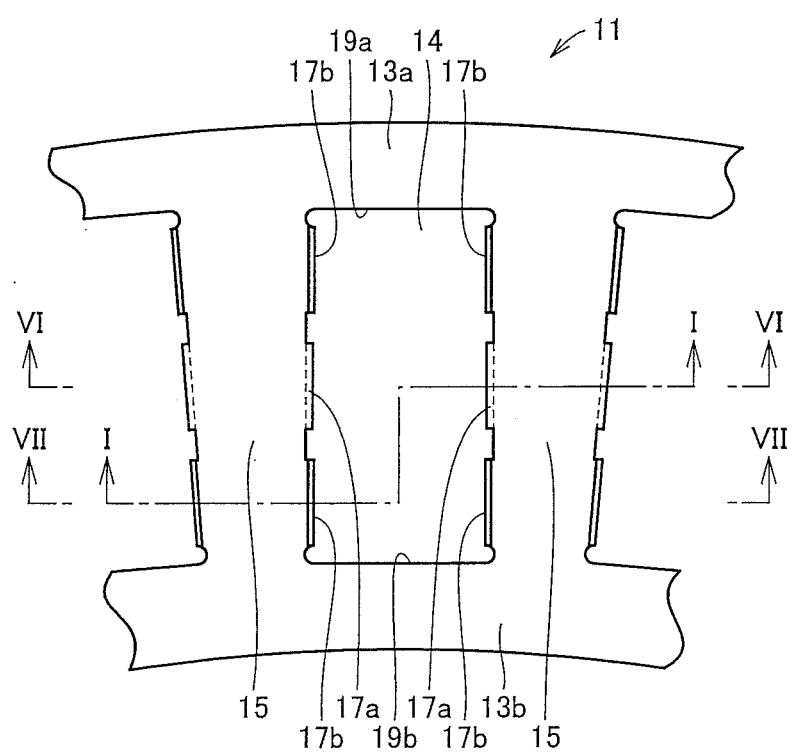
FIG. 4 is an enlarge view showing a pocket part of the retainer shown in FIG. 2, viewed from the thickness direction.
Figure 5:
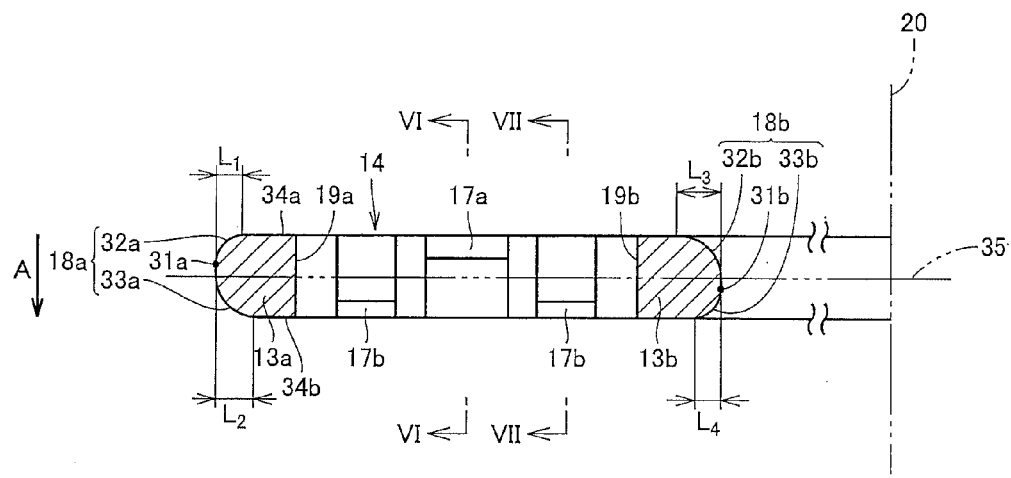
FIG. 5 is a sectional view showing the retainer shown in FIG. 2 viewed from arrows V-V in FIG. 2.
Figure 6:
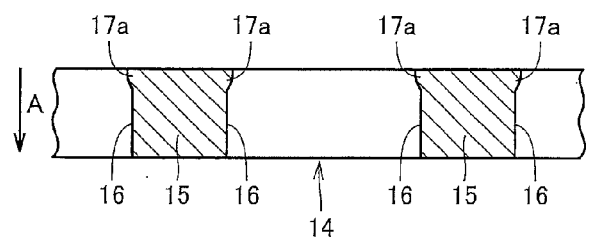
FIG. 6 is a sectional view showing the pocket part shown in FIG. 4 viewed from arrows VI-VI in FIG. 4.
Figure 7:
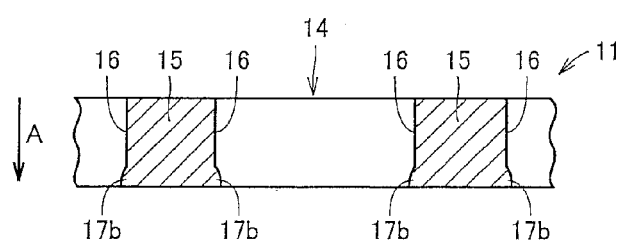
FIG. 7 is a sectional view showing the pocket part shown in FIG. 4 viewed from arrows VII-VII in FIG. 4.

An embodiment of the present invention will be described with reference to the drawings hereinafter. FIG. 2 is a view showing a retainer provided in a thrust roller bearing according to one embodiment of the present invention, viewed from a thickness direction. FIG. 3 is a side view showing the retainer shown in FIG. 2. FIG. 4 is an enlarged view showing a pocket part IV in FIG. 2 in the retainer shown in FIG. 2. FIG. 5 is a sectional view showing the retainer shown in FIG. 2 viewed from arrows V-V in FIG. 2. FIG. 6 is a sectional view showing the pocket part of the retainer shown in FIG. 4 viewed from arrows VI-VI in FIG. 4. FIG. 7 is a sectional view showing the pocket part of the retainer shown in FIG. 4 viewed from arrows VII-VII in FIG. 4.

With reference to FIGS. 2 to 7, a description will be made of a constitution of the retainer provided in the thrust roller bearing according to one embodiment of the present invention. As shown in FIGS. 2 and 3, a retainer 11 of the thrust roller bearing is not bent in a thickness direction and it is in the form of a ring. The retainer 11 has a through hole 12 penetrating in the thickness direction at its center. The retainer 11 has a plurality of pockets 14 for containing rollers. The pockets 14 are arranged in a roughly radial manner. The retainer 11 includes a pair of annular parts having different diameters, that is, an outer diameter annular part 13a and an inner diameter annular part 13b, and a plurality of column parts connecting the annular parts 13a and 13b so as to form pockets 14.

The retainer 11 has first and second roller retaining parts 17a and 17b for retaining the rollers. More specifically, the first roller retaining part 17a is provided at a radial center of the retainer 11, in a side wall surface 16 of the column part 15 positioned on circumferential each side of the pocket 14. The second roller retaining parts 17b are provided at radial both ends of the retainer 11, in the side wall surface 16 of the column part 15. The retainer 11 is guided by the first and second roller retaining parts 17a and 17b.

The first and second roller retaining parts 17a and 17b project from the side wall surface 16 of the column part 15 toward the pocket 14. The first roller retaining part 17a is formed so as to be continued to the side wall surface 16 of the column part 15 in the thickness direction. Similarly, the second roller retaining part 17b is formed so as to be continued to the side wall surface 16 of the column part 15 in the thickness direction. Each of the first and second roller retaining parts 17a and 17b has an arc-shaped cross section (refer to FIGS. 6 and 7). In other words, they are formed by curved lines, more specifically, by arc-shaped lines in their cross sections shown in FIGS. 6 and 7. Curvature radiuses of the first and second roller retaining parts 17a and 17b are constituted so as to be smaller than that of the roller contained in the pocket. The first and second roller retaining parts 17a and 17b are provided by a coining process with a tool.

Here, in the cross section shown in FIG. 5, that is, in a cross section cut by a plane parallel to a rotation axis 20 of the retainer 11 and containing the rotation axis 20 thereof, an outer diameter end face and an inner diameter end face of the retainer 11 include projection parts 18a and 18b projecting in a radial direction, respectively.

The projection part 18a is formed of a first surface 32a and a second surface 33a. The first surface 32a extends in the radial direction so as to be continued from a width surface 34a positioned on one side of the retainer 11 in the thickness direction. The second surface 33a extends in the radial direction so as to be continued from a width surface 34b positioned on the other side of the retainer 11 in the thickness direction. The first surface 32a and the second surface 33a have arc-shaped configuration and have different curvature radiuses in the cross section shown in FIG. 5. More specifically, the curvature radius of a circle composing the first surface 32a is smaller than the curvature radius of a circle composing the second surface 33a. Thus, a radial length $L_1$ of the first surface 32a can be differentiated from a radial length $L_2$ of the second surface 33a. In this case, radial length $L_1$ of the first surface 32a is shorter than the radial length $L_2$ of the second surface 33a. In addition, referring to the cross section shown in FIG. 5, a point 31a formed between the first and second surfaces 32a and 33a and projecting the most in the radial direction at the projection part 18a is provided at a position shifted upward from a center line 35 of the retainer 11 in the thickness direction, shown by a three-dot chain line in FIG. 5.

Similarly, the projection part 18b is formed of a first surface 32b extending so as to be continued from the width surface 34a, and a second surface 33b extending so as to be continued from the width surface 34b. While the first surface 32b and the second surface 33b also have arc-shaped configuration, a curvature radius of a circle composing the first surface 32b is larger than a curvature radius of a circle composing the second surface 33b. Thus, a radial length $L_3$ of the first surface 32b is longer than a radial length $L_4$ of the second surface 33b. In addition, a point 31b formed between the first and second surfaces 32b and 33b and projecting the most in the radial direction at the projection part 18b is provided at a position shifted downward from the center line 35.

Next, a constitution of the thrust roller bearing comprising the above retainer 11 according to one embodiment of the present invention will be described. The thrust roller bearing according to one embodiment of the present invention is arranged at a part to which a thrust load is applied in an automatic transmission of a car, for example. Such thrust roller bearing is used in a manual transmission, a continuously variable transmission, a torque converter, a compressor for a car air conditioner, and the like.

Figure 1:
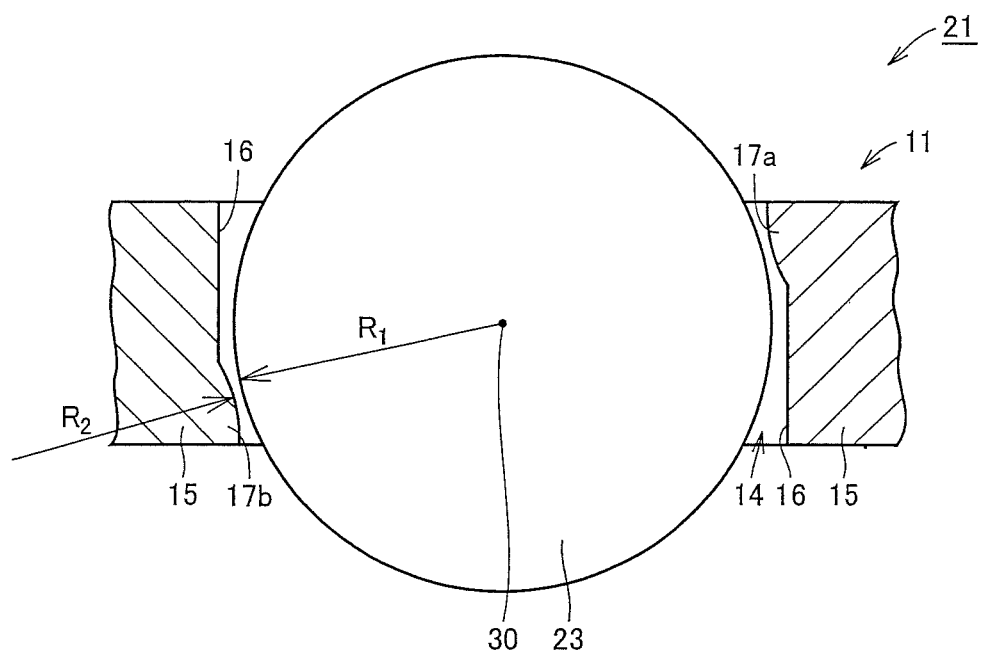
FIG. 1 is a sectional view showing a part of a thrust roller bearing according to one embodiment of the present invention.
Figure 8:
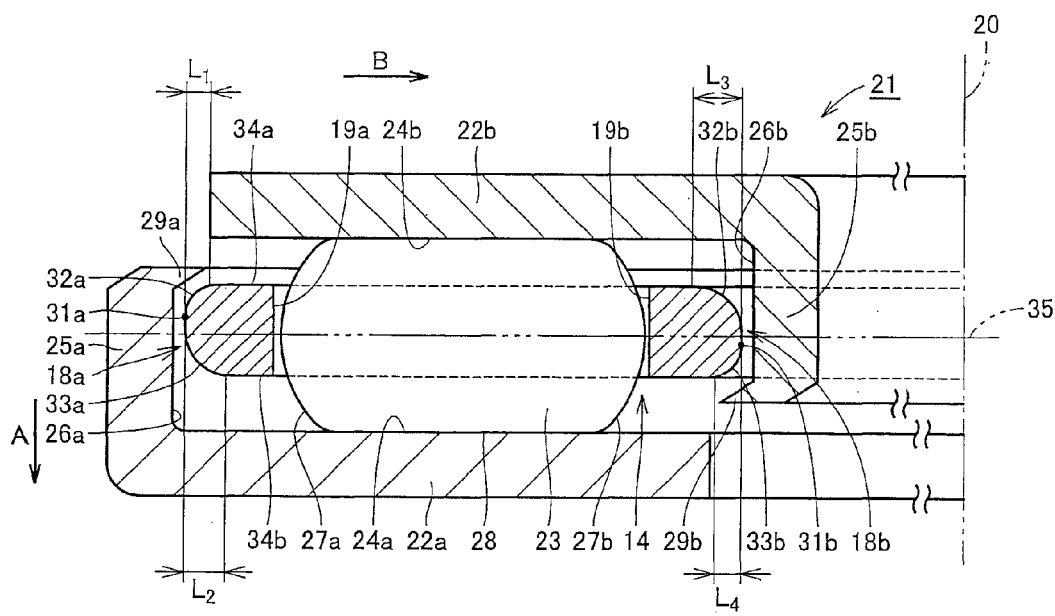
FIG. 8 is a sectional view showing a part of the thrust roller bearing provided with the retainer shown in FIG. 2.

FIG. 8 is a sectional view showing a part of the thrust roller bearing according to one embodiment of the present invention and the part corresponds to FIG. 5. FIG. 1 is a sectional view showing a part of a thrust roller bearing 21 shown in FIG. 8, and the part corresponds to a sectional view when the retainer 11 is cut along arrows I-I in FIG. 4. Referring to FIGS. 1 to 8, the thrust roller bearing 21 comprises a pair of track rings 22a and 22b, a plurality of rollers 23 rolling on track surfaces 24a and 24b of the pair of track rings 22a and 22b, and the retainer 11 retaining the plurality of rollers 23. The thrust roller bearing 21 supports a thrust load applied in the thickness direction of the retainer 11.

A flange part 25a extending from an outer diameter side end toward the track surface 24a, that is, in the direction opposite to an arrow A is provided in the track ring 22a arranged on the outer diameter side. In addition, a click-shaped staking 29a extending toward a radial inner side is provided at an axial end of the flange part 25a. The stakings 29a are provided at circumferential positions in the annular track ring 22a. A flange part 25b extending from an inner diameter side end toward the track surface 24b, that is, in the direction of the arrow A is provided in the track ring 22b arranged on the inner diameter side. In addition, a click-shaped staking 29b extending toward a radial outer side is also provided at an axial end of the flange part 25b. The stakings 29b are also provided at circumferential positions in the annular track ring 22b. The retainer 11 retaining the rollers 23 in the pockets 14 is arranged so as to be incorporated between the pair of track rings 22a and 22b. In this case, the flange part 25a of the track ring 22a is positioned on the radial outer side of the retainer 11, and the flange part 25b of the track ring 22b is positioned on the radial inner side. The retainer 11 surmounts the stakings 29a and 29b when it is incorporated. The stakings 29a and 29b prevent the incorporated retainer 11 from being separated from the track rings 22a and 22b.

Here, an operation state of the thrust roller bearing 21 will be described. Referring to FIG. 1, the retainer 11 is guided by the roller 23 in the operation state. That is, the retainer 11 is not in contact with the track rings 22a and 22b in the thickness direction, that is, with the track surfaces 24a and 24b during the operation of the thrust roller bearing 21. Therefore, torque is not generated by the contact between the track rings 22a and 22b and the retainer 11 in the thickness direction during the operation of the thrust roller bearing 21.

Here, the first and second roller retaining parts 17a and 17b have the arc-shaped configuration in the cross section shown in FIG. 1, that is, in the cross section provided by cutting the retainer 11 by a plane containing the first and second roller retaining parts 17a and 17b for retaining the roller 23 and perpendicular to a center axis 30 of the roller. In addition, when it is assumed that a curvature radius of the roller 23 is $R_1$, and curvature radiuses of the first and second roller retaining parts 17a and 17b are $R_2$, a relation between them is such that $R_1 \geq R_2$. According to this constitution, when the roller 23 is in contact with the first and second roller retaining parts 17a and 17b of the retainer 11, they can be in contact with each other on the smooth surfaces, and a contact area between them can be small. Therefore, friction can be reduced and low torque can be implemented in the thrust roller bearing 21.

In this case, the first and second roller retaining parts 17a and 17b are provided in each side wall surface 16 of the pocket 14 in the circumferential direction. Thus, since the roller 23 is in contact with the retainer 11 on circumferential each side wall surface of the pocket 14, the roller 23 and the retainer 11 can be more stably in contact with each other.

In addition, since the retainer 11 has the first roller retaining part 17a provided in the one side wall surface 16 of the pocket 14 and abutting on the roller 23 from the upper side of the roller 23, and the second roller retaining part 17b provided in the other side wall surface 16 of the pocket 14 and abutting on the roller 23 from the lower side of the roller 23, the first roller retaining part 17a provided in the one side wall surface 16 is in contact with the upper side of the roller 23, and the second roller retaining part 17b provided in the other side wall surface 16 is in contact with the lower side of the roller 23. Thus, the position of the retainer 11 in the thickness direction can be stabled.

Furthermore, since the first and second roller retaining parts 17a and 17b are provided at different positions in the axial direction of the roller 23, when the roller 23 is housed in the pocket 14, it can be easily housed. In addition, as the first and second roller retaining parts 17a and 17b are formed by the coining process as described above, when the first and second roller retaining parts 17a and 17b are formed at the different positions in the axial direction of the roller 23, the coining process by pressing from the thickness direction can be easily performed.

In addition, during the operation of the thrust roller bearing 21, the roller 23 rolls and the track rings 22a and 22b and the retainer 11 rotate together. In this case, the rotation axis (not shown) of the track rings 22a and 22b and the rotation axis 20 of the retainer 11 are designed so as to coincide with each other. However, the rotation axis of the track rings 22a and 22b and the rotation axis 20 of the retainer 11 are shifted in some cases due to the dimensional deviation of the track rings 22a and 22b and the retainer 11. In addition, when the thrust roller bearing 21 is used in the transmission, it is arranged vertically. In this case, the track rings 22a and 22b and the retainer 11 are in contact in the radial direction. More specifically, an inner diameter surface 26a of the flange part 25a and an outer diameter surface 26b of the flange part 25b of the track rings 22a and 22b are in contact with the retainer 11. In this case, a load is applied from the track rings 22a and 22b to the retainer 11 in the radial direction, that is, in the direction of an arrow B or the opposite direction thereof in FIG. 8.

However, since the above retainer 11 is not bent in the thickness direction, its radial strength is high. Thus, even when the load is applied from the track rings 22a and 22b in the radial direction in the operation state, the retainer 11 can be prevented from being damaged and deformed. In addition, even when the track rings 22a and 22b and the retainer 11 are in contact with each other in the radial direction, since the outer diameter and the inner diameter end faces of the retainer 11 contain the projection parts 18a and 18b projecting in the radial direction, the contact area between the track rings 22a and 22b and the retainer 11 can be small. Thus, friction in the contact state can be small and torque can be low.

In this case, the contact areas of the outer diameter end face and the inner diameter end face of the retainer 11 can be small and low torque can be implemented.

As described above, since the retainer 11 of the above thrust roller bearing 21 is not bent in the thickness direction, its strength in the radial direction is high. Thus, even when the retainer 11 is provided in the thrust roller bearing 21 and receives a load applied from the track rings 22a and 22b in the radial direction in the operation state, it is prevented from being damaged and deformed. Furthermore, since the retainer 11 is guided by the roller, the track rings 22a and 22b and the retainer 11 do not come in contact with each other in the thickness direction during the operation of the thrust roller bearing 21. In addition, since the first and second roller retaining parts 17a and 17b are composed of the curved lines projecting toward the pocket 14 in the cross section shown in FIG. 1, the contact area between the roller 23 and the first and second roller retaining parts 17a and 17b can be small. Thus, the friction generated when the retainer 11 and the roller 23 are in contact with each other can be considerably reduced. Therefore, the low torque can be implemented in the thrust roller bearing 21.

Here, as shown in FIG. 8, as for the projection part 18a, the point 31a projecting the most in the diameter direction is positioned on the upper side of the center line 35, and the radial length $L_2$ of the second surface 33a is longer than the radial length $L_1$ of the first surface 32a. Thus, the retainer 11 easily surmounts the staking 29a when incorporated. In addition, since the point 31a projecting the most in the diameter direction is positioned on the upper side of the center line 35, and the radial length $L_1$ of the first surface 32a is shorter than the radial length $L_2$ of the second surface 33a, the retainer 11 can be easily caught by the staking 29a after incorporated between the track rings 22a and 22b. Therefore, the retainer 11 can be prevented from being separated from the track rings 22a and 22b.

Similarly, as for the projection part 18b, the point 31b projecting the most in the diameter direction is positioned on the lower side of the center line 35, and the radial length $L_3$ of the first surface 32b is longer than the radial length $L_4$ of the second surface 33b. Thus, the retainer 11 easily surmounts the staking 29b when incorporated. In addition, since the point 31b is positioned on the lower side of the center line 35, and the radial length $L_4$ of the second surface 33b is shorter than the radial length $L_3$ of the first surface 32b, the retainer 11 can be easily caught by the staking 29a after incorporated between the track rings 22a and 22b.

Therefore, according to the above constitution, when the retainer 11 is incorporated between the track rings 22a and 22b, it can be easily incorporated between them, and after it is incorporated, it can be prevented from being separated from the track rings 22a and 22b.

In addition, according to the projection part, although the point projecting the most in the radial direction is arranged at the position shifted from the center line of the retainer in the thickness direction, and the radial length of the first surface and the radial length of the second surface are differentiated in the above embodiment, either one of the above constitutions may be provided.

Figure 9:
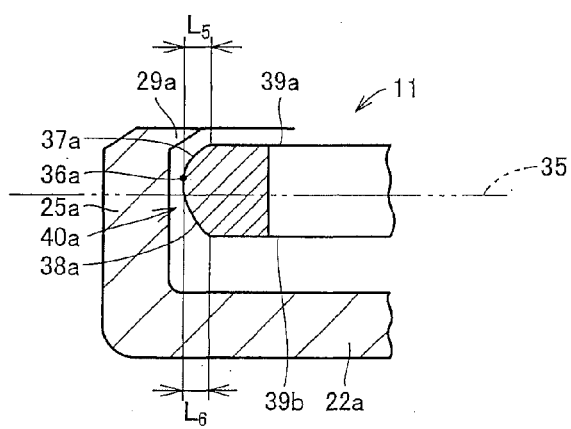
FIG. 9 is a sectional view showing a part of a thrust roller bearing according to another embodiment of the present invention.

For example, as shown in FIG. 9, it may be constituted such that while a radial length $L_5$ of a first surface 37a extending from a width surface 39a is equal to a radial length $L_6$ of a second surface 38a projecting from a width surface 39b, a point 36a projecting the most in the radial direction in a projection part 40a is arranged at a position shifted upward from a center line 35. In this case also, the retainer 11 can be easily incorporated between the track rings 22a and 22b, and it is prevented from being separated from the track rings 22a and 22b.

Figure 10:
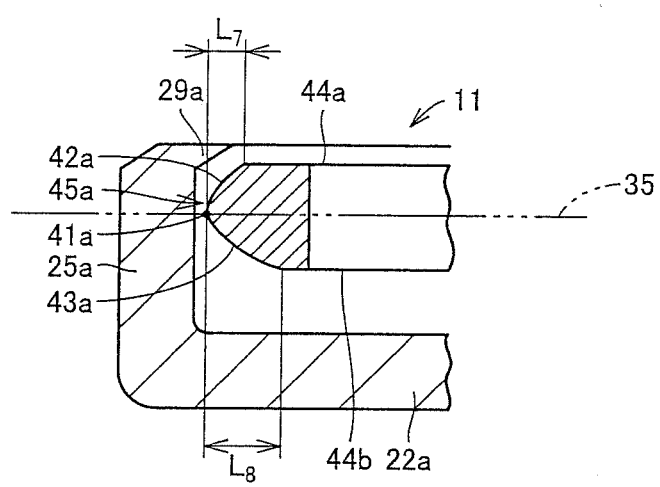
FIG. 10 is a sectional view showing a part of a thrust roller bearing according to still another embodiment of the present invention.
Figure 11:
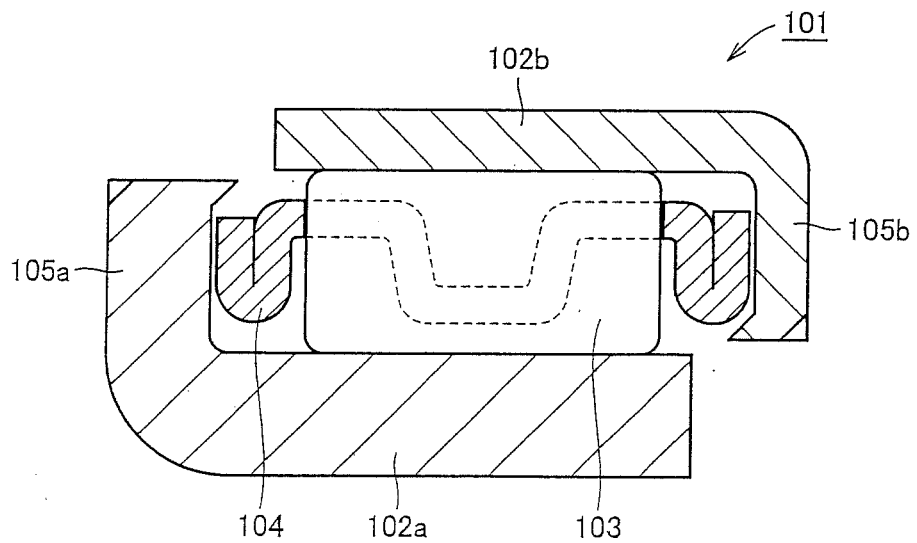
FIG. 11 is a sectional view showing a part of a conventional thrust roller bearing.

In addition, as shown in FIG. 10, it may be constituted such that while a point 41a projecting the most in the radial direction in a projection part 45a is positioned on a center line 35, a radial length $L_7$ of a first surface 42a extending from a width surface 44a is differentiated from a radial length $L_8$ of a second surface 43a extending from a width surface 44b. In this case, the radial length $L_7$ of the first surface 42a is to be shorter than the radial length $L_8$ of the second surface 43a. In this case also, the retainer 11 can be easily incorporated between the track rings 22a and 22b, and it is prevented from being separated from the track rings 22a and 22b.

In addition, the retainer 11 is preferably formed of metal in view of its strength. Furthermore, when soft nitriding, curburizing, nitrocarburizing processes are performed, the strength can be improved more.

Here, the roller 23 provided in the thrust roller bearing 21 may have a constitution in which its end face includes a curved surface projecting in the axial direction of the roller. More specifically, end faces 27a and 27b of the roller 23 are rounded so as to project in the axial direction of the roller 23. Thus, even when the end faces 27a and 27b of the roller 23 come in contact with wall surfaces 19a and 19b of the pocket 14 in the operation state of the thrust roller bearing 21, their contact surface can be small. Therefore, the lower torque can be implemented in the thrust roller bearing 21.

In addition, full crowning may be provided in a rolling surface 28 of the roller 23 provided in the thrust roller bearing 21. The full crowning means that crowning is provided for the whole of the rolling surface 28 such that a diameter at an axial center of the roller may be maximum. Thus, the contact area between the roller 23 and the track rings 22a and 22b can be small, so that sliding due to a circumferential speed difference between the outer diameter side and the inner diameter side can be prevented. Thus, the lower torque can be implemented in the thrust roller bearing 21.

In addition, although the roller retaining part is provided in each circumferential side of the wall surface of the pocket in the above embodiment, it may be provided only in one side wall surface. In addition, the first roller retaining part abutting on the roller from the upper side of the roller and the second roller retaining part abutting on the roller from the lower side of the roller may be provided on the same side wall surface at the same axial position of the roller.

In addition, although the end faces on the outer diameter side and the inner diameter side of the retainer 11 are provided with the projection parts 18a and 18b projecting in the radial direction in the above embodiment, it may be such that either one of the end face on the outer diameter side or the inner diameter side is provided with the projection part projecting in the radial direction. In addition, although the whole of the end faces on the outer diameter side and the inner diameter side project in the radial direction in the above embodiment, it may be such that one parts of the end faces on the outer diameter side and the inner diameter side are provided with the projection parts projecting in the radial direction.

In addition, the projection part may be roughly R-configuration or another sectional configuration instead of the above sectional configuration. Thus, the projection part can have the more appropriate configuration.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The retainer of the thrust roller bearing and the thrust roller bearing according to the present invention can be effectively used in an automatic transmission of a car.

What is claimed is:

1. A thrust roller bearing comprising a plurality of rollers and an annular retainer having a plurality of pockets for containing the plurality of rollers, the annular retainer is not bent in a thickness direction and is guided by the plurality of rollers, the thickness direction which corresponds to a longitudinal axis of a rotational axis of the thrust roller bearing, wherein each of said plurality of pockets includes roller retaining parts retaining one of said plurality of rollers, each of the roller retainer parts includes a curved line, having a curvature radius, projecting toward said pocket in a cross section provided by cutting said retainer by a plane containing said roller retaining part and perpendicular to a center axis of said roller, and further wherein each of the pockets are arranged generally in a radial manner with respect to the rotational axis of the thrust roller bearing and the roller retainer parts prevent the plurality of rollers from dropping out from the annular retainer in the longitudinal direction of the rotational axis, wherein each said pocket has opposing circumferential side wall surfaces, and each of said roller retaining parts are provided on said circumferential side wall surfaces, and wherein said roller retaining parts include a first roller retaining part provided in one side wall surface of said pocket and abutting on said roller from the upper side of said roller, and a second roller retaining part provided in the other side wall surface of said pocket and abutting on said roller from the lower side of said roller, wherein the retainer is made of metal, and wherein a curvature radius of the roller is $R_1$, the curvature radius of the roller retaining parts is $R_2$, and a relationship between the roller and the roller retaining parts is such that $R_1 > R_2$.

2. The thrust roller bearing according to claim 1, wherein said roller retaining part has an arc shape in said cross section.

3. The thrust roller bearing according to claim 1, wherein said first roller retaining part and said second roller retaining part are provided at different axial positions of said roller.

4. The thrust roller bearing according to claim 1, wherein at least one radial end face of said retainer includes a projection part projecting in a radial direction.

5. The thrust roller bearing according to claim 4, wherein in a cross section cut by a plane parallel to a rotation axis of said retainer and containing the rotation axis thereof, a point projecting the most in the radial direction in said projection part is arranged at a position shifted from a center line of said retainer in a thickness direction.

6. The thrust roller bearing according to claim 4, wherein said projection part comprises a first surface and a second surface positioned on both sides of said retainer in the thickness direction and extending so as to be continued from top and bottom surfaces of said retainer extending in the radial direction, and in a cross section cut by a plane parallel to a rotation axis of said retainer and containing the rotation axis thereof, a radial length of said first surface is differentiated from a radial length of said second surface.

\* \* \* \* \*